Jan. 19, 1965     O. C. HARPER     3,165,878
COMBINE HEADER LEVELLER

Filed Feb. 12, 1963     3 Sheets-Sheet 1

Orville C. Harper
INVENTOR.

Jan. 19, 1965   O. C. HARPER   3,165,878
COMBINE HEADER LEVELLER
Filed Feb. 12, 1963   3 Sheets-Sheet 2

Orville C. Harper
INVENTOR.

Jan. 19, 1965

O. C. HARPER 3,165,878

COMBINE HEADER LEVELLER

Filed Feb. 12, 1963

Orville C. Harper
INVENTOR.

BY

United States Patent Office 3,165,878
Patented Jan. 19, 1965

3,165,878
COMBINE HEADER LEVELLER
Orville C. Harper, Dumont, Iowa
Filed Feb. 12, 1963, Ser. No. 257,973
5 Claims. (Cl. 56—209)

This invention primarily relates to an attachment for a combine or other earth-working machine for the purpose of levelling the header thereof.

It has often been a problem when harvesting grain to cut the grain at a uniform height. The prime reason for this is that ordinarily the field level on which the grain is grown is now uniform. Thus, it will often happen that the sickle cutting heads of a combine are disposed at an angle to the terrain upon which the combine is travelling, so that the grain will not be cut at a uniform height above the ground level. To overcome this problem, the device comprising the subject matter of the instant invention was devised so that the shaft mounting the conventional header of a combine upon the frame of the combine may be tilted with respect to the ground level thus compensating for non-level terrain and insuring that the grain is all cut at a uniform height.

Accordingly, it is the primary object of this invention to provide a device mounted on a conventional combine which when actuated will vary the angle of inclination of the header of said combine with respect to the ground level.

Another object of this invention is to provide a device of the character indicated which is operated by hydraulic means which may be controlled by the operator of the combine without leaving his seat in the cab.

A still further object of this invention is to provide a device of the character indicated which requires a minimum number of parts to assemble, which is simple in operation, but yet effective to perform its intended function.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
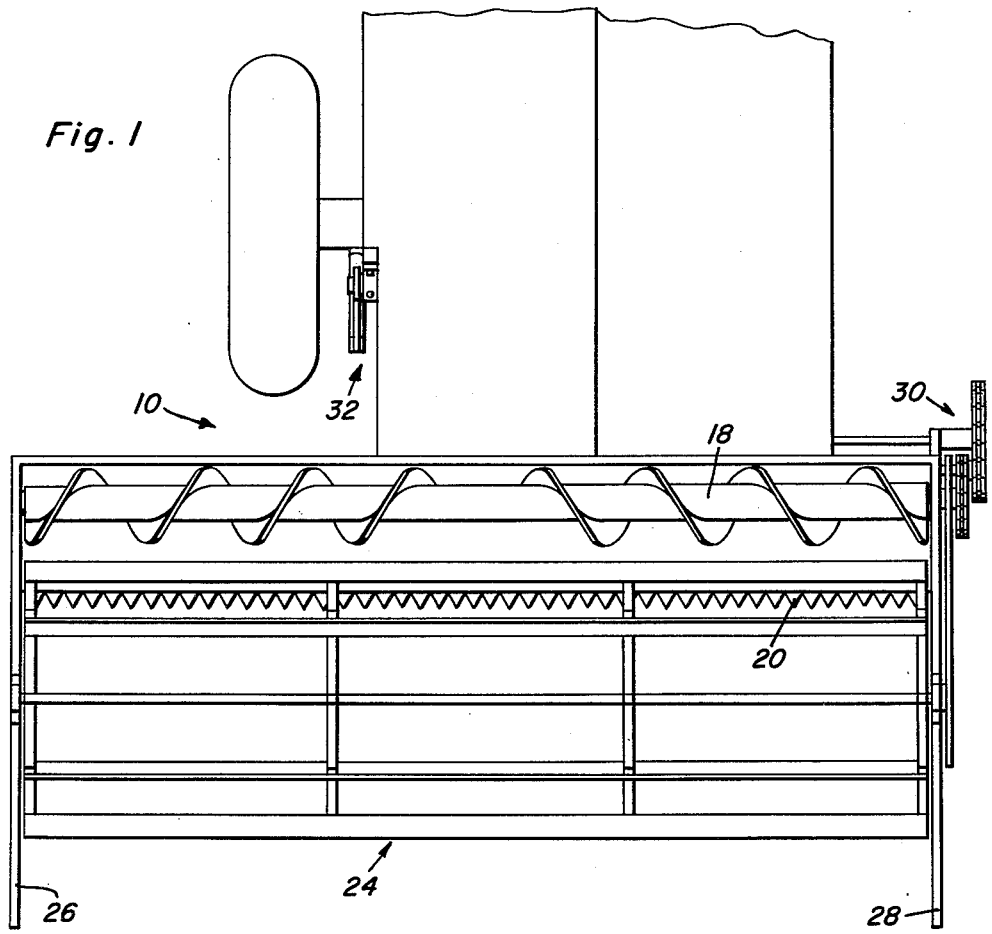
FIGURE 1 is a top plan view illustrating a conventional combine and the attachment comprising the subject matter of the instant invention.

Referring now more specifically to the drawings, a conventional combine 10 is shown, which comprises a header 12 mounted upon the frame of the combine vehicle. The header 12 is mounted upon the frame by means of a transverse shaft 14 extending through the header 12 and attached to a bearing such as 16 at one end thereof and a self-aligning bearing at the other end thereof (not shown). The header 12 has mounted thereon conventional equipment such as an auger-type conveyor 18 for conveying cut grain to a threshing portion of the combine and sickle teeth such as 20 for cutting said grain. Also mounted upon said header by a suitable mounting frame such as 22 is a conventional type paddle reel 24 which bends the grain to be cut towards the sickle teeth. Suitable swath boards 26 and 28 are also mounted upon said header and extend in advance of the combine to define the path to be cut through the harvested field. Suitable driving pulleys are provided for the conveyor and reel and are connected to the power take-off from the combine as shown generally at 30.

Figure 2:
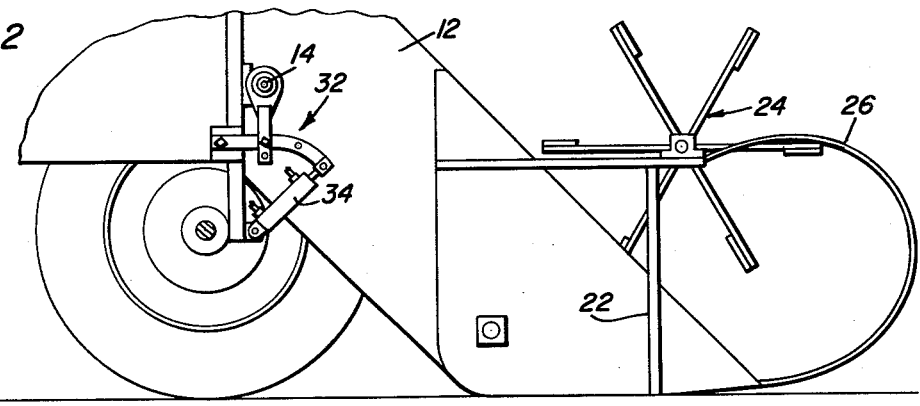
FIGURE 2 is a left handed side view in elevation of the device shown in FIGURE 1.
Figure 4:
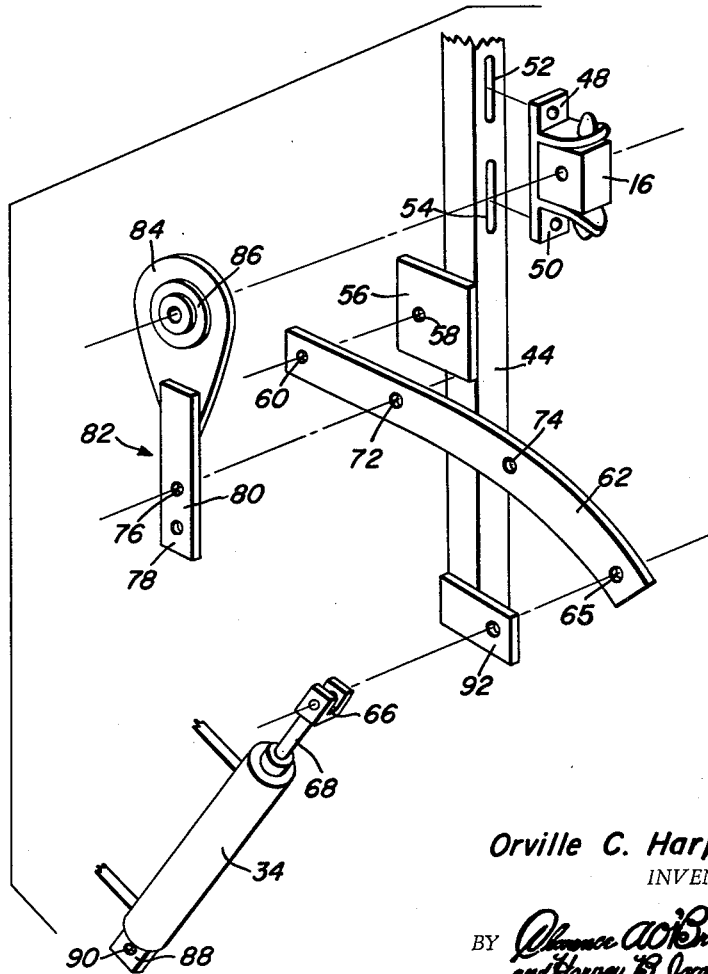
FIGURE 4 is a perspective exploded view of the various components comprising the levelling attachment.
Figure 3:
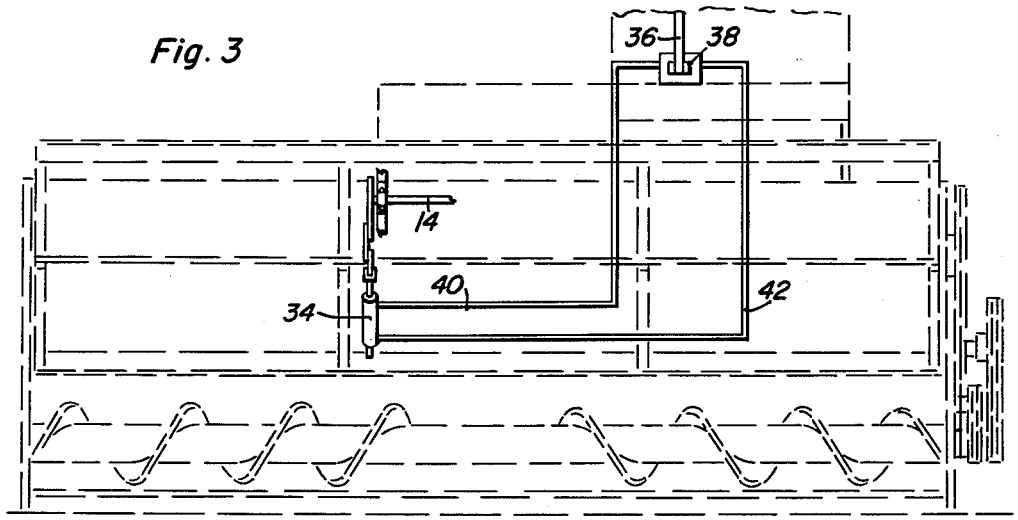
FIGURE 3 is a schematic layout of the hydraulic feed lines and showing their attachment to the hydraulic cylinder used to actuate the attachment of the instant invention.
Figure 5:
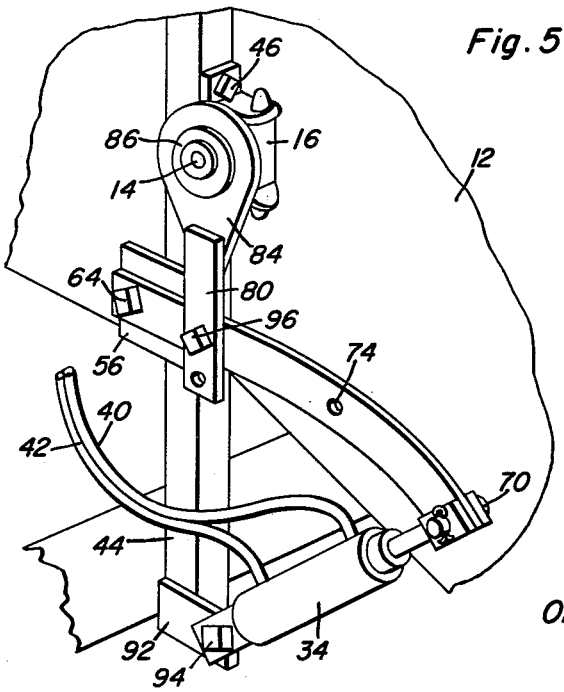
FIGURE 5 is a perspective view of the levelling attachment showing all the elements thereof in operational relationship.

Referring now to FIGURES 2, 4 and 5 an attachment is shown for vertically raising and lowering one end of the header mounting shaft 14 to thereby tilt the header frame and hence the cutting assembly 20 with respect to the ground level. Said attachment, generally designated by the numeral 32, is hydraulically operated by a hydraulic cylinder 34 controlled by the operator by a suitable lever 36 mounted in the cab of the combine and adapted to open and close a suitable valve mechanism such as 38 for alternately admitting and withdrawing hydraulic fluid through the hydraulic lines 40 and 42 to the cylinder 34 for causing actuation thereof and raising and lowering its piston.

The attachment 32 further comprises the bearing 16 which mounts the header shaft 14 therein and which is correspondingly slidably mounted upon the frame extension 44 by means of bolts such as 46 placed through the ear extensions 48 and 50 of the bearing 16 and through vertically spaced slots 52 and 54 cut in the frame extension member 44. It should therefore be apparent from FIGURE 4 that limited vertical movement for the bearing 16 is contemplated within the slots 52, 54 which in turn will thus raise and lower said end of the shaft 14. As already noted, the shaft 14 at its other end is supported by a self-aligning bearing thus enabling the shaft to be tilted with respect to the ground level thereby varying the angle of inclination of the header and cutting teeth 20 with respect to the ground level.

The frame extension member 44 has a rectangular shaped plate 56 formed integral therewith, by any suitable means such as welding or the like. An aperture 48 is formed through said plate and is adapted to align with an aperture 60 formed through and at the rear end of a pivotable lever 62. A suitable pivot connection is maintained between the lever 62 and the plate 56 by extending a pin or bolt such as 64 through the aligned apertures 60 and 58. The forward end of the lever 62 has an arcuate form for the purpose which will hereinafter become apparent. The forward end of the lever 62 also has an aperture 65 formed therethrough which pivotally mounts the forked end 66 of the piston 68 of the hydraulic cylinder 34. Said pivotal connection is maintained by a suitable pin 70 which is adapted to extend through the bifurcated end portion 66 of the piston 68 and the aligned aperture 65 in the lever 62. The lever 62 also has a pair of intermediate apertures 72 and 74 formed therethrough. The aperture 72 is adapted to cooperate and be aligned with either one of the apertures 76 and 78 formed in a depending lug portion 80 of a bearing 82 having an upper portion 84 which is integrally attached to the header shaft 14 by any suitable means such as a bushing 86 formed rigid with the upper portion 84 of the bearing 82. It should also be noted that the hydraulic cylinder 34 is attached at its rearward end by means of an apertured lug 88 having an aperture 90 formed therethrough to another horizontal lug 92 formed integral with the depending frame portion 44. A suitable bolt such as 94 passes through the aligned apertures 90, 92 to maintain the requisite pivotal connection.

The operation of the device should now become apparent. Upon the operator actuating the valve 38 hydraulic fluid may be admitted through the line 42 which will actuate the piston 68 within the hydraulic cylinder 34 and cause it to be extended. This will in turn cause pivoting of the lever 62 with respect to the frame thereby vertically raising the lever and bearing 82. It should be noted that a suitable pivotal connection is maintained between the lug portion 80 of the bearing 82 and the lever 62 by a suitable bolt such as 96 pivotally connecting the two parts by extending through aligned aperture 72 and either one of the two apertures 76 or 78. Due to raising of the bearing 82, which is integrally attached to one end of the header shaft 14, the header shaft will be correspondingly raised vertically, since the bearing 16 is also caused to be vertically raised and guided in the slots 54, 52 and will tilt the shaft with respect to the ground level. It should be noticed that due to the arcuate end portion of the lever 62, the hydraulic cylinder may be pivoted so that the bifurcated portion 66 disposed on the forward end of the piston 68 may be engaged with the lever 62 by means of the aperture 74 cooperating with the apertures in said bifurcated end. Due to this, the bifurcated end 66 is moved to a greater vertical position without energizing the hydraulic cylinder 34 and thus the angle of tilt may be caused to be greater than is possible with the connection of the hydraulic cylinder 34 to the lever 62 at the aperture 65. That is, the possible vertical extent of the piston has been increased. It should also be noted that if the aperture 78 were aligned with the aperture 72 in the lever 62 a still greater vertical adjustment would be possible of the one end of the shaft 14 inasmuch as the end of the shaft will initially be elevated. It should also be noted that due to the various adjustment properties of the attachment many combinations of conditions may be accommodated. For example, the lever 62 may be so mounted on the frame relative to the piston 34 as to be in an intermediate position of its piston stroke so that both raising and lowering of the header shaft 14 can be accomplished. This will be controlled by either forcing fluid through the line 40 or 42 as the case may warrant. Furthermore, by aligning the apertures 76 and 72 so that the header will be tilted off-center initially and more specifically the left hand portion of the header will be lowered with respect to the right hand portion of the header, by actuation of the cylinder 34, the header may be levelled or may be tiled past the dead-center position so that the left hand portion of the header 12 is raised with respect to the right hand portion. It should thus be apparent and appreciated that the various adjustment properties of the attachment may be so arranged to get the desired results. Furthermore, the attachment comprising the subject matter of the instant invention is completely independent of the wheel axle structure of the combine also.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A farm machine comprising a mobile frame, a working header, a transverse shaft mounting said header on said frame, bearings receiving the opposite ends of the shaft, said bearings being mounted on said frame for allowing a raising and lowering of the header relative to the frame, one of said bearings being mounted on said frame for movement solely in a vertical plane carrying therewith the corresponding shaft end, said vertical plane paralleling the longitudinal axis of the shaft, and means for effecting this vertical movement, said means comprising an elongated lever pivoted to said frame for movement in a vertical plane, said lever projecting transversely past said shaft in spaced relation thereto and in general vertical alignment with the movable bearing, pivotally mounted link means interconnecting the lever and shaft end received within the movable bearing, and an extensible motor means having one end thereof fixed to the frame and the other end thereof fixed to the lever whereby an extension of said motor means will effect a pivoting of the lever and consequently a vertical movement of movable bearing and shaft end received therein.

2. The machine of claim 1 wherein said link means is adjustable so as to vary the distance between the lever and shaft end connected thereto.

3. The machine of claim 2 including means for enabling a varying of the point of engagement between the lever and the motor means for varying the degree of movement responsive to a predetermined extension of the motor means.

4. The machine of claim 3 wherein said frame includes a vertical portion rigid therewith, said movable bearing being positioned in sliding engagement with this portion, at least one vertically elongated slot in said portion, and bolt means engaged through the bearing and the slot in a manner so as to mount said bearing for movement solely in a vertical direction.

5. A farm machine comprising a mobile frame, a working header, a transverse shaft mounting said header on said frame, bearings receiving the opposite ends of the shaft, said bearings being mounted on said frame for allowing a raising and lowering of the header relative to the frame, and means mounted on said frame for effecting a movement of one end of said shaft, relative to the other end, solely in a vertical plane paralleling the longitudinal axis of the shaft, said frame including a vertical portion rigid therewith, one of said bearings being positioned in sliding engagement with this portion, at least one vertically elongated slot in said portion, and bolt means engaged through said one of said bearings and the slot in a manner so as to mount this bearing for movement solely in a vertical direction.

References Cited in the file of this patent

UNITED STATES PATENTS 2,913,865     Carruthers _____ Nov. 24, 1959